United States Patent
Evans et al.

[11] Patent Number: 5,330,145
[45] Date of Patent: Jul. 19, 1994

[54] HOLDER FOR DRINKING VESSELS

[75] Inventors: Vernon C. Evans, Monroe County; David E. Miller, St. Clair County, both of Ill.

[73] Assignee: Kup-It,Inc., Red Bud, Ill.

[21] Appl. No.: 972,860

[22] Filed: Nov. 6, 1992

[51] Int. Cl.$^5$ .............................................. A47K 1/00
[52] U.S. Cl. ................... 248/311.2; 248/912; 248/131; 224/42.45 R
[58] Field of Search ............ 248/311.2, 349, 314, 248/911, 912, 131, 214; 224/42.45 R, 42.44, 42.43, 281; 220/751, 703, 737

[56] References Cited

U.S. PATENT DOCUMENTS

| | | | |
|---|---|---|---|
| 2,581,879 | 1/1952 | Powers, Jr. | 248/131 |
| 3,524,614 | 8/1970 | Sorth | 248/131 |
| 4,854,468 | 8/1989 | Dahlquist, III et al. | 220/737 |
| 4,892,281 | 1/1990 | DiFilippo et al. | 248/311.2 |
| 4,915,337 | 4/1990 | Iwasaki | 248/311.2 |
| 5,052,649 | 10/1991 | Hunnicutt | 224/42.45 R X |
| 5,088,673 | 2/1992 | Chandler | 224/42.45 R X |
| 5,102,086 | 4/1992 | Thomason | 248/311.2 |
| 5,135,195 | 8/1992 | Dane | 248/310 X |
| 5,174,534 | 12/1992 | Mitchell | 248/311.2 |

Primary Examiner—Karen J. Chotkowski
Attorney, Agent, or Firm—Polster, Lieder, Woodruff & Lucchesi

[57] ABSTRACT

An adapter for enabling a traditional cup holder to support a relatively large drinking vessel includes a base having an upwardly opening socket which is large enough to receive the vessel and a downwardly projecting locking element which is small enough to fit into the traditional cup holder. The locking element rotates on the base about an eccentric axis so that when it is turned it will drive the base into a nearby upright surface and thereby hold the base firmly on the traditional cup holder. The base may also be fitted with a hanger for suspending it from the upper edge of a trim panel or some other support.

24 Claims, 2 Drawing Sheets

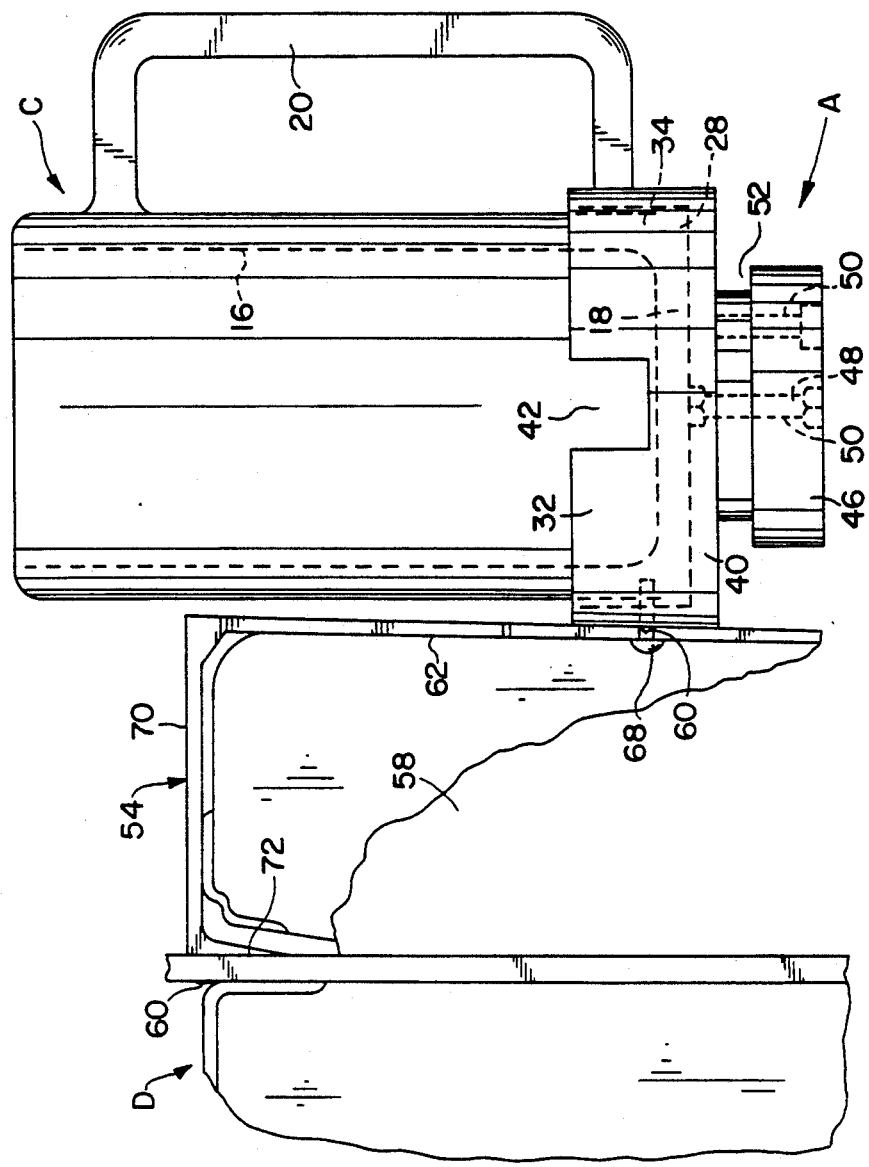
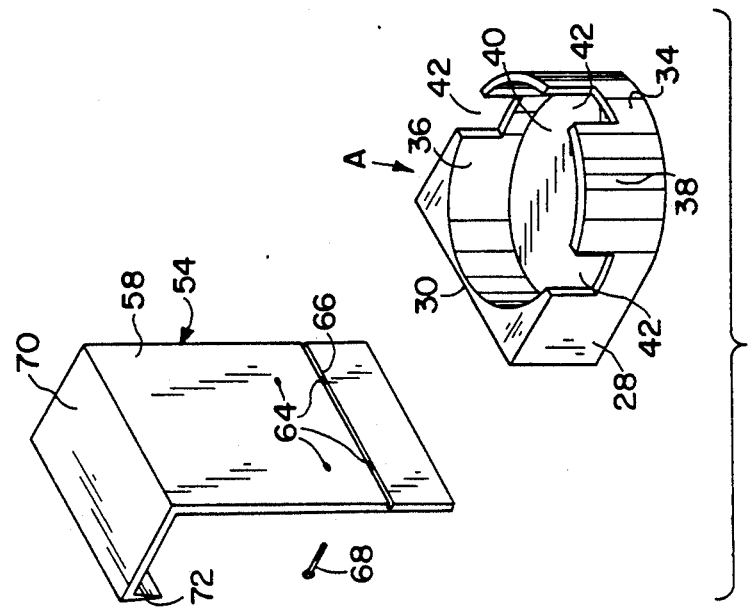

HOLDER FOR DRINKING VESSELS

BACKGROUND OF THE INVENTION

This invention relates in general to holders for drinking vessels and similar vessels and more particularly to an adapter for supporting a drinking vessel in a traditional cup holder.

Many automobiles of recent manufacture come equipped with drinking cup holders. These devices may amount to nothing more than a socket in the back side of the glove compartment door—a socket which opens upwardly when the door is in its fully open position—or perhaps a socket which opens upwardly from some other surface in the passenger compartment. Some cup holders of more sophisticated design are embodied in a thin drawer-like slide which moves into and out of the dashboard. When the drawer is retracted its front face lies flush with the exposed surface of the dashboard, rendering the drawer barely visible. On the other hand, when the drawer is pulled outwardly to its extended position, it presents two apertures, the diameters of which are slightly larger than the typical 10 or 12 oz. beverage cup. The drawer-type holder carries a bar which swings downwardly as the drawer extends and lies directly beneath the apertures when the drawer reaches its fully extended position. In this position, the bar serves as a supporting surface for cups that are placed in the apertures.

While drinking cups come in a variety of shapes and sizes, the typical automotive cup holder will accommodate cups of generally only one size or shape—usually the 10 to 12 oz. cup with a slightly tapered side wall and no handle, the type of cup one would expect to obtain from a fast food restaurant. But larger and more substantial drinking vessels have come into widespread use—vessels having handles and otherwise resembling tankards. Even if these vessels were small enough to fit into the typical cup holder, which they normally do not, the handle would interfere with the cup holder and cause the vessel to tilt.

The present invention resides in a cup holder which will accommodate large drinking vessels—drinking vessels having greater capacity than the typical 10 oz. or 12 oz. beverage cup. It will also accommodate vessels having handles. The invention, in addition, resides in a holder which functions as an adaptor to enable the typical small holder to support drinking vessels of larger capacity with considerable stability.

DESCRIPTION OF THE DRAWINGS

In the accompanying drawings which form part of the specification and wherein like numerals and letters refer to like parts wherever they occur.

FIG. 5 is a side view of the adapter fitted with a hanger, and further showing the hanger fitted over an interior side panel of an automotive door and the adapter holding a drinking vessel; and FIG. 6 is an exploded perspective view of the adapter and its hanger.

DETAILED DESCRIPTION

Figure 1:
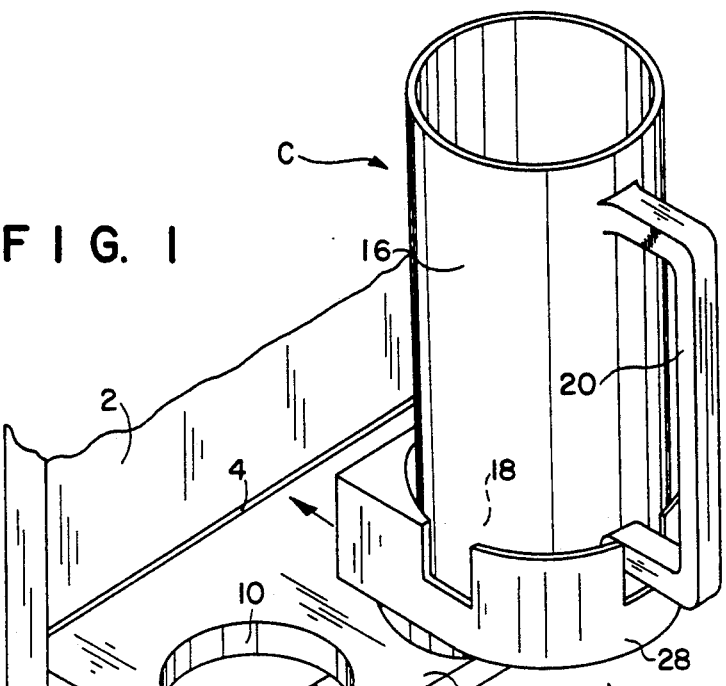
FIG. 1 is a perspective view showing an adapter which is constructed in accordance with the present invention, fitted to a drawer-type cup holder and supporting a drinking vessel too large for the drawer-type cup holder to accommodate.

Referring to the drawings, an adapter A (FIG. 1) enables a conventional cup holder B in an automobile to hold a drinking vessel C which is much larger than those for which the holder B is designed—larger in the sense that it has a greater diameter or width, not to speak of capacity. The adapter A, which in itself is a cup holder, fits into the automotive cup holder B and indeed engages the holder so that it is not easily dislodged from or for that matter shifted on the automotive cup holder. The drinking vessel C has a relatively large capacity and diameter, certainly a diameter much larger than that of the cup for which the cup holder B is designed.

The automotive cup holder B which the adapter A engages extends from a dashboard 2 (FIG. 1) in an automotive vehicle, indeed from a pocket 4 in the dashboard 2. The holder B includes a slide 6 which moves horizontally into and out of the pocket 4 between extended and retracted positions. It has a front face 8, which lies flush with the upright face of the dashboard 2 when the slide 6 is retracted, and also two relatively large openings or apertures 10 which lie side-by-side and have their axes oriented vertically. The apertures 10 are fully exposed beyond the face of the dashboard 2 when the slide 6 is extended, but are totally concealed when the slide 6 is retracted, as is all of the slide 6 except its front face 8. The cup holder B also includes a U-shaped bar 12 which pivots near the sides of the apertures 10. When the slide 6 is retracted, the legs and indeed the entire bar 12 lies along the slide 6 and like the slide 6 is contained within the pocket 4. But as the slide 6 is withdrawn from the pocket 4, the U-shaped bar 12 swings downwardly, and when the slide 6 reaches its fully extended position, the bar 12 depends from the slide 6 with the bight, that is the center section between the two legs, lying directly beneath the apertures 10.

Those apertures 10 in diameter are only slightly larger then the typical 10 or 12 oz paper cup used by fast food restaurants to serve drinks. One simply inserts the typical cup into either one of the apertures 10 and allows it to descend until its bottom comes to rest on the bight of the U-shaped bar 12. Thus, the cup holder 12 confines and stabilizes the typical drinking cup on the dashboard within easy reach of the driver.

But neither aperture 10 of the slide 6 is large enough to accept the drinking vessel C, which resembles a tankard more than a cup (FIGS. 1 & 5). In this regard, the vessel C has a generally cylindrical side wall 16, the diameter of which is greater then the diameter of either aperture 10, and a bottom wall 18. It further has a handle 20 which projects radially from the side wall 16. Thus, the drinking vessel C will not fit into either aperture 10, and the cup holder B in and of itself will not hold the vessel C. The adapter A enables the cup holder to hold the drinking vessel C fully stabilized.

The adapter A includes (FIGS. 2-4 & 6) a base 28 having a flat back face 30, flat parallel side faces 32 and a curved front face 34. In addition, the base 28 has a cylindrical socket 36 which opens upwardly, its periphery following, but being set slightly inwardly from, the curved front face 34, so as to leave a relatively thin arcuate wall 38 at the front of the socket 36. The socket 36 has a bottom or floor 40 which is textured or covered with a high friction material. In diameter, the socket 36 is slightly larger than the side wall 16 of the vessel C. Moreover, the arcuate wall 38 is provided with three cutouts 40 arranged at 90° intervals, with one opening forwardly out of the socket 36 and the other two opening laterally. Each of the cutouts 42 is large enough to receive the handle 20 of the drinking vessel C. Indeed, the drinking vessel C is simply lowered into the socket 36 with its handle 20 aligned with one of the cutouts 42. The bottom wall 18 comes to rest on the floor 40 of the base 28, while the handle 20 lies within the cutout 42 with which it aligned (FIGS. 1 & 5). In this regard, the cutouts 42 are wider than the handle 20 and their lower margins, while being above the floor 40 of the base 28, lie below the bottom of the handle 20 and thus do not interfere with the handle 20.

In addition to the base 28, the adapter A includes a locking or coupling element or disk 46 (FIGS. 2-3) which is attached to the base 28 and projects downwardly from it. Indeed, the disk 46 is held to the base 28 with a screw 48 that extends through an axial hole 50 in the disk 46 and threads into the base 28, allowing the disk 46 to rotate on the base 28. The disk 46, which is circular, fits against the bottom surface of the base 28 and is smaller than the base 28. It thus to a large measure is obscured by the base 28. Moreover, in diameter it is smaller than the apertures 10 in the slide 6 so that it will fit into either of the apertures 10 and allow the base 28 to rest directly against the upper surface of slide 6. While smaller in diameter than the aperture 10, the disk 46 is thicker than the slide 6 and contains an undercut 52 which in itself is deeper than the slide 6 is thick.

Figure 2:
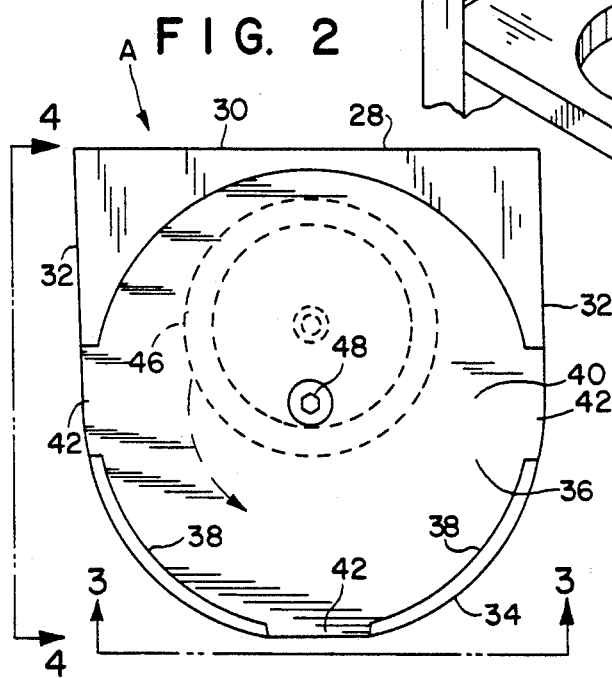
FIG. 2 is a top-plan view of the adapter.
Figure 3:
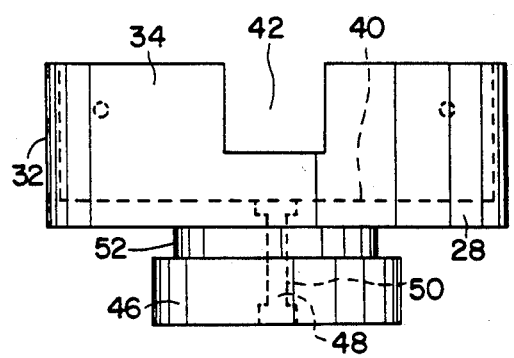
FIG. 3 is a front view of the adapter taken along line 3—3 of FIG. 2.
Figure 4:
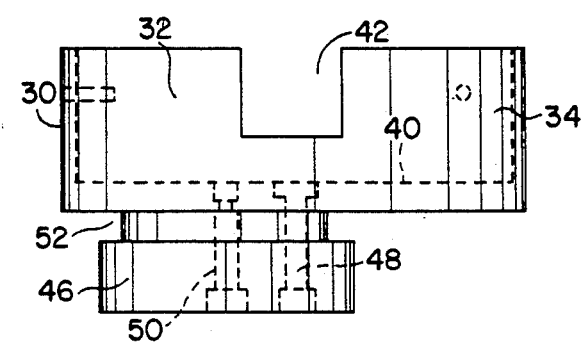
FIG. 4 is a side view of the adapter taken along line 4—4 of FIG. 2.

The screw 48 threads into and is secured to the base 28 with its axis colinear with the axis of the cylindrical socket 36—or in other words the screw aligns with the center of the socket 36 (FIGS. 2-4). It does not, however, lie at the center of the disk 46 for the hole 50 through which it extends offset about ¾ inch. Thus, while the disk 46 will rotate on the base 28, it does so eccentrically. When the disk 46 is in one of the apertures 10 of the slide 6, this eccentricity enables the disk 46, when rotated, to drive the base 28 toward and lodge it against an upright surface such as the face of the dashboard 2.

To install the adapter A on the conventional drawer-type cup holder B and thereby render the cup holder B suitable for supporting the larger drinking vessel C, the user first withdraws the slide 6 of the cup holder B, bringing it to its fully extended position. Thereupon, the user lowers the adapter A toward the slide 6 with the disk 46 presented downwardly and aligned with one of the apertures 10 in the slide 6. The disk 46 enters the selected aperture 10 until the base 28 comes to rest against the top of the slide 6. With the adapter A so positioned on the slide 6, the user reaches beneath the slide 6 and turns the disk 46. Since the disk 46 is eccentric to its axis of rotation, that is the screw 48, the disk 46 will bear against the edge or margin of the aperture 10 and shift the base 28 over the slide 6. The rotation is such that the disk 46 drives the base 28 toward the dashboard 2 (FIG. 1) and indeed brings the back face 30 of the base 28 firmly against the exposed upright surface of the dashboard 2, that is the surface out of which the slide pocket 4 opens. Indeed, the eccentric disk 46 lodges the base 28 firmly against the dashboard 2 so the adapter A will not shift on the cup holder B and this serves to better stabilize the adaptor A on the slide 6 of the cup holder B. Being deeper than the slide 6, the undercut 52 in the disk 46 receives the slide 6 along the edge of its aperture 10 and prevents the adapter A from being lifted off the slide 6.

The user may now place the larger drinking vessel C in the adapter A simply by lowering the vessel C into the cylindrical socket 36 with its handle aligned with one of its cutouts 42 (FIGS. 1 & 5). The cutout 42 receives the handle 20 of the vessel C, allowing the bottom wall 18 of the vessel C to come to rest on the floor 40 of the socket 36. The adapter A thus confines the drinking vessel C and prevents it from shifting about as the vehicle encounters bumps or negotiates turns. The textured or high friction surface that forms the floor 40 of the base 28 tends to hold vessels C, which are somewhat smaller in diameter than the socket 36, in place notwithstanding the absence of total confinement.

The screw 48 which holds the disk 46 against the bottom of the base 28, normally extends through the offset hole 50 and positions the disk 46 eccentrically on the base 28, and this is desirable when the adapter A is installed on the drawer-type cup holder B, for the disk 46 may be rotated to drive the back face 30 of the base against the face of the dashboard 2. However, where the cup holder resides in a simple pocket with a bottom, such as typically found on the back face of a glove compartment door, it may be desirable to attach the disk 46 to the base 28 so that it is concentric to the socket 36 of the base 28. To this end, the disk 46 is provided with another axial hole 50 which is centered with respect to the socket 36 (FIGS. 2 & 5). When the disk 46 is attached to the base 28 with its screw 48 extended through the centered hole 50, the disk 46 is centered with respect to socket 36 in the base 28 and will position that socket 36 directly over the pocket in the cup holder.

In addition to the base 28 and disk 46, the adapter A may be provided with a hanger 54 (FIGS. 5 & 6) for suspending it from a door D at the passenger compartment of the vehicle instead of from the dashboard 2. In this regard, the door D includes an interior trim panel 58 which extends upwardly to a slot 60 out of which the glass window pane for the door D rises. The hanger 54 includes a face plate 62 having upper and lower pairs of holes 64 and a score line 66 extending through the lower set. The holes 64 of one pair or the other receive screws 68 which thread into the base 28 at its back face 30 to secure the base 28 to the hanger 54. The pair of holes 64 one selects for the screws 68 depends on how high one wants the base 28 on the hanger 54. If the upper pair of holes 64 are selected, one may break the face place 62 off at the score line 66, so that it does not project below the base 28 and perhaps interfere with projections on the interior panel 58 of the door D. At its upper end the face plate 62 merges into short horizontal piece 70 which in turn merges into a short downwardly directed lip 72 which is thin enough to fit into the slot 60 in the door D, even when the glass window pane is elevated.

Thus, when the base 28 is attached to the hanger 54 with the screws 68, the adapter A may be supported on the door D generally anywhere along the interior trim panel 58 that is convenient for the operator of the vehicle. The user simply inserts the lip 72 of the hanger 54 into the slot 60 at the upper end of the trim panel 58 so that the hanger 54—and of course the base 28 which is attached to the hanger 54—are suspended from the upper end of the trim panel 58. With the adapter A located along the trim panel 58 of the door D, the occupant of the vehicle may support the drinking vessel C at a convenient location where it is confined and will not tip, even when the vehicle encounters bumps or negotiates turns.

Preferably, the base 28, the disk 46 and the hanger 54 are sold as a kit which may be assembled as desired so that the adapter A may be supported on the cup holder B or suspended from the door D of the vehicle. However, the individual components may be sold separately or in combinations suited for either use with the cup holder B or for use on the door D.

This invention is intended to cover all changes and modifications of the example of the invention herein chosen for purposes of the disclosure which do not constitute departures from the spirit and scope of the invention.

What is claimed is:

1. In combination with a cup holder that includes a slide that withdraws from a generally upright surface and when withdrawn presents beyond the surface at least one upwardly opening aperture for receiving a drinking cup of modest size, so that the slide will confine the drinking cup; an adaptor for enabling the cup holder to support a larger drinking vessel having a width greater than the width of the aperture, said adapter comprising: a base that is larger than the aperture in the slide, the base resting on the slide over the aperture and having an end presented toward the upright surface and an upwardly opening socket which is large enough to receive the larger drinking vessel; and a coupling element attached to and projecting downwardly from the base onto the aperture of the slide and having a side which lies along the margin of the aperture and prevents the base from sliding off the slide, the coupling element being movable generally horizontally relative to the base by manual manipulation such that the distance between the side of the element and the end of the base will change, the element by reason of the movement bearing at its side against the margin of the aperture and lodging the end of the base against the upright surface from which the slide is withdrawn so as to better stabilize the adapter on the slide.

2. The combination according to claim 1 wherein the coupling element rotates on the base about an axis that is fixed with respect to the base and is eccentric with respect to the coupling element.

3. The combination according to claim 1 wherein the coupling element has an undercut adjacent to the underside of the base and the undercut is large enough to receive the margin of the aperture in the slide, whereby the adapter is retained on the slide.

4. The combination according to claim 1 wherein the base has a generally flat back and contacts the upright surface along its back face.

5. The combination according to claim 4 wherein the base has a curved front face which is presented away from the upright surface out of which the slide withdraws and at least one cutout to receive a handle on the larger drinking vessel.

6. The combination according to claim 5 wherein the socket is generally circular and the front face generally follows the curvature of the circular socket.

7. The combination according to claim 1 wherein the coupling element rotates relative to the base about an axis that is fixed with respect to the base and is offset from the center of the coupling element.

8. The combination according to claim 7 wherein the coupling element is a circular disk and the axis of rotation lies parallel to the center axis of the disk.

9. In combination with a cup holder that includes a slide that withdraws from a generally upright surface and when withdrawn presents beyond the surface at least one upwardly opening aperture for receiving a drinking cup of modest size, so that the slide will confine the drinking cup; an adapter for enabling the cup holder to support a larger drinking vessel having a width greater than the width of the aperture, said adapter comprising: a base that is larger than the aperture in the slide, the base resting on the slide over the aperture and having an upwardly opening socket which is large enough to receive the larger drinking vessel; and a coupling element attached to and projecting downwardly from the base into the aperture of the slide where it lies along the margin of the aperture and thereby prevents the base from sliding off the slide, the coupling element having an undercut located adjacent to the underside of the base, with the undercut being large enough to receive the margin of the aperture in the slide, the coupling element being movable relative to the base by manual manipulation and being shifted such that it bears against the margin of the aperture at its undercut to engage the adapter with the slide so that the adapter is retained on and cannot be lifted from the slide and such that it lodges the base against the upright surface from which the slide is withdrawn to better stabilize the adapter on the slide.

10. The combination according to claim 9 wherein the coupling element is circular.

11. An adapter for installation on a cup holder which has an upwardly presented opening for enabling the cup holder to receive and support a drinking vessel that is larger than the opening in the holder, said adapter comprising: a base having a socket which opens upwardly to receive a drinking vessel and a floor at the bottom of the socket; a coupling element attached to the base beneath the floor of the socket for reception in the opening of the holder; and means for enabling the coupling element to rotate about an axis that is fixed with respect to the base and generally perpendicular to the floor of the base, the axis further being offset from the center of the coupling element, so that the coupling element, when rotated in the opening of the holder, will function as an eccentric and drive the base over the holder to a desired location.

12. An adapter according to claim 11 wherein the coupling element is a circular disk.

13. An adapter according to claim 12 wherein the coupling element has concentric side surfaces of greater and lesser diameter, with the surface of lesser diameter being adjacent to the base so as to provide an undercut along the bottom of the base.

14. An adapter according to claim 12 wherein the base has a generally flat back face that lies generally parallel to the axis about which the coupling element rotates.

15. An adapter for holding a relatively large drinking vessel and for rendering a conventional cup holder, that is located along an upright surface, suitable for holding such a drinking vessel, said adapter comprising: a base having an upwardly opening socket which is wide enough to receive the relatively large drinking vessel; a coupling element projecting downwardly from the base directly beneath the socket and being of a width less than the socket, the element being configured to fit into a conventional cup holder in place of a cup; and means for enabling the coupling element to rotate relative to the base about an axis that is eccentric to the element and to thereby cause the base when placed over and supported on a conventional cup holder to be driven horizontally over the conventional cup holder and against the nearby upright surface, the coupling element being configured for manual manipulation.

16. An adapter according to claim 15 wherein the coupling element has an undercut located adjacent to the undersurface of the base.

17. An adapter according to claim 16 wherein the coupling element is a disk of circular configuration.

18. An adapter according to claim 15 wherein socket in the base is of circular cross section and the axis about which the coupling element rotates is generally colinear with the axis of the socket.

19. An adapter according to claim 15 wherein the base has a flat back face which is generally upright.

20. An adapter according to claim 19 wherein the socket in the base is of generally circular cross section and the base has a curved front wall which generally follows the contour of the socket.

21. An adapter according to claim 19 and further comprising a hanger attached to the base at the back face of the base, the hanger extending upwardly from the base, then away from the base, and then downwardly in the form of a lip, whereby the hanger may be hooked over the edge of an object, such as the interior panel of a vehicular door, to support the drinking vessel adjacent to that object.

22. An adapter according to claim 15 wherein the coupling element is a circular disk that rotates relative to the base about an axis that is fixed with respect to the base, with the axis of rotation for the disk being vertical and passing through the socket.

23. An adapter according to claim 22 wherein the bottom of the base is flat and the axis of rotation for the disk is perpendicular to the flat bottom of the base.

24. An adapter according to claim 23 wherein the disk has surfaces of lesser and greater diameter which are concentric, with the surface of lesser diameter being adjacent to the flat bottom of the base so as to form an undercut along the bottom of the base.

* * * * *